US009239871B2

(12) United States Patent
Shuma

(10) Patent No.: US 9,239,871 B2
(45) Date of Patent: Jan. 19, 2016

(54) SYSTEM AND METHOD FOR ANALYZING SEQUENTIAL DATA ACCESS EFFICIENCY

(75) Inventor: Kevin P. Shuma, Celina, TX (US)

(73) Assignee: CA, Inc., New York, NY (US)

( * ) Notice: Subject to any disclaimer, the term of this patent is extended or adjusted under 35 U.S.C. 154(b) by 863 days.

(21) Appl. No.: 13/176,998

(22) Filed: Jul. 6, 2011

(65) Prior Publication Data

US 2013/0013651 A1 Jan. 10, 2013

(51) Int. Cl.
*G06F 17/30* (2006.01)

(52) U.S. Cl.
CPC ...... *G06F 17/30595* (2013.01); *G06F 17/3056* (2013.01); *G06F 17/30292* (2013.01); *G06F 17/30306* (2013.01)

(58) Field of Classification Search
CPC ............... G06F 17/30595; G06F 17/30306
USPC .................................. 707/807; 711/165, 167
See application file for complete search history.

(56) References Cited

U.S. PATENT DOCUMENTS

| | | | |
|---|---|---|---|
| 5,596,747 A * | 1/1997 | Katabami et al. .............. 707/687 |
| 5,999,943 A * | 12/1999 | Nori et al. ................ 1/1 |
| 6,061,678 A * | 5/2000 | Klein et al. ................ 1/1 |
| 6,122,640 A * | 9/2000 | Pereira ............... 707/648 |
| 6,144,970 A * | 11/2000 | Bonner et al. ............ 1/1 |
| 6,209,000 B1 * | 3/2001 | Klein et al. ............ 707/741 |
| 6,223,182 B1 * | 4/2001 | Agarwal et al. .......... 1/1 |
| 6,243,718 B1 * | 6/2001 | Klein et al. .............. 1/1 |
| 6,349,310 B1 * | 2/2002 | Klein et al. ............ 707/703 |
| 6,411,964 B1 * | 6/2002 | Iyer et al. ............... 1/1 |
| 6,606,626 B1 * | 8/2003 | Ponnekanti ............. 1/1 |
| 6,738,790 B1 * | 5/2004 | Klein et al. ............ 1/1 |
| 7,519,637 B2 * | 4/2009 | Shuma et al. ........... 1/1 |
| 8,225,063 B2 * | 7/2012 | Sita .................... 711/167 |
| 8,549,222 B1 * | 10/2013 | Kleiman et al. ......... 711/114 |
| 8,566,308 B2 * | 10/2013 | Musial et al. ........... 707/719 |
| 2006/0036618 A1 * | 2/2006 | Shuma et al. ........... 707/100 |
| 2007/0016582 A1 * | 1/2007 | Kawamura et al. ........... 707/7 |
| 2011/0320451 A1 * | 12/2011 | Boh et al. ............. G06F 7/08 707/737 |
| 2012/0246160 A1 | 9/2012 | Thomsen et al. |
| 2013/0013651 A1 | 1/2013 | Shuma |
| 2013/0031084 A1 | 1/2013 | Herrnstadt |
| 2013/0103655 A1 | 4/2013 | Fanghaenel et al. |
| 2013/0275367 A1 | 10/2013 | Shuma |

OTHER PUBLICATIONS

Hitachi, "HiRDB Version 8 Description", Mar. 2007, Hitachi, Edition 1, pp. 285-293.
Gary H. Sockut and Balakrishna R. Iyer, "Online Reorganization of Databases", Jul. 2009, ACM, vol. 41, pp. 1-136.

* cited by examiner

*Primary Examiner* — Christyann Pulliam
*Assistant Examiner* — Mellissa M Ohba
(74) *Attorney, Agent, or Firm* — Myers Bigel Sibley & Sajovec, PA

(57) ABSTRACT

A system and method determines sequential access efficiency for a database table. A number of data block changes that occur during a sequential access of a plurality of rows in a database table are determined. The sequential access efficiency is calculated based on the determined number of data block changes.

22 Claims, 7 Drawing Sheets

| DATA ROW | 1 | 2 | 3 | 4 | 5 | 6 | 7 | 8 | 9 | 10 | 11 | 12 | 13 | 14 | 15 | 16 | 17 | 18 | 19 | 20 | 21 | 21 DATA ROW KEY VALUES |
|---|---|---|---|---|---|---|---|---|---|---|---|---|---|---|---|---|---|---|---|---|---|---|
| DATA BLOCK | 1 | 1 | 1 | 1 | 1 | 2 | 2 | 2 | 2 | 2 | 3 | 3 | 3 | 3 | 3 | 4 | 4 | 4 | 4 | 4 | 5 | BLOCKS IN USE = 5 |
| BLOCK CHANGE | | | | | | 1 | | | | | 2 | | | | | 3 | | | | | 4 | BLOCK CHANGES = 4 |
| | | | | | | | | | | | | | | | | | | | | | | CALC EFFICIENCY |
| | | | | | | | | | | | | | | | | | | | | | | (5-1) / 4 = 100% |

FIG. 2A

| DATA ROW | 1 | 2 | 3 | 4 | 5 | 6 | 7 | 8 | 9 | 10 | 11 | 12 | 13 | 14 | 15 | 16 | 17 | 18 | 19 | 20 | 21 | 21 DATA ROW KEY VALUES |
|---|---|---|---|---|---|---|---|---|---|---|---|---|---|---|---|---|---|---|---|---|---|---|
| DATA BLOCK | 1 | 2 | 1 | 1 | 1 | 3 | 2 | 2 | 2 | 2 | 1 | 3 | 4 | 4 | 4 | 3 | 3 | 4 | 5 | 4 | 3 | BLOCKS IN USE = 5 |
| BLOCK CHANGE | | 1 | 2 | | | 3 | 4 | | | | 5 | 6 | 7 | | | 8 | | | 9 | 10 | 11 | 12 | BLOCK CHANGES = 12 |
| | | | | | | | | | | | | | | | | | | | | | | CALC EFFICIENCY |
| | | | | | | | | | | | | | | | | | | | | | | (5-1) / 12 = 33% |

FIG. 2B

| DATA ROW | 1 | 2 | 3 | 4 | 5 | 6 | 7 | 8 | 9 | 10 | 11 | 12 | 13 | 14 | 15 | 16 | 17 | 18 | 19 | 20 | 21 | 21 DATA ROW KEY VALUES |
|---|---|---|---|---|---|---|---|---|---|---|---|---|---|---|---|---|---|---|---|---|---|---|
| DATA BLOCK | 1 | 2 | 1 | 1 | 1 | 3 | 2 | 2 | 2 | 2 | 1 | 3 | 4 | 4 | 4 | 3 | 3 | 4 | 5 | 4 | 3 | BLOCKS IN USE = 5 |
| BLOCK CHANGE |  | 1 | 2 |  |  | 3 | 4 |  |  |  | 5 | 6 | 7 |  |  | 8 |  | 9 | 10 | 11 | 12 | BLOCK CHANGES = 12 |
|  |  | 1 |  |  |  | 2 | 3 |  |  |  | 4 | 5 | 6 |  |  |  |  | 7 |  | 8 |  | CALC EFFICIENCY |
|  |  |  |  |  |  |  |  |  |  |  |  |  |  |  |  |  |  |  |  |  |  | (5-1) / 12 = 33% |
|  |  |  |  |  |  |  |  |  |  |  |  |  |  |  |  |  |  |  |  |  |  |  |
| BUFFER A | 1 | 1 | 1 | 1 | 1 | 1 | 2 | 2 | 2 | 2 | 2 | 3 | 3 | 3 | 3 | 3 | 3 | 5 | 5 | 3 |  | (5-1) / 8 = 50% WITH BUFFERS 2 |
| BUFFER B |  | 2 | 2 | 2 | 2 | 3 | 3 | 3 | 3 | 3 | 1 | 1 | 4 | 4 | 4 | 4 | 4 | 4 | 4 | 4 |  |  |

FIG. 3A

| DATA ROW | 1 | 2 | 3 | 4 | 5 | 6 | 7 | 8 | 9 | 10 | 11 | 12 | 13 | 14 | 15 | 16 | 17 | 18 | 19 | 20 | 21 | 21 DATA ROW KEY VALUES |
|---|---|---|---|---|---|---|---|---|---|---|---|---|---|---|---|---|---|---|---|---|---|---|
| DATA BLOCK | 1 | 2 | 1 | 1 | 1 | 3 | 2 | 2 | 2 | 2 | 1 | 3 | 4 | 4 | 4 | 3 | 3 | 4 | 5 | 4 | 3 | BLOCKS IN USE = 5 |
| BLOCK CHANGE |  | 1 | 2 |  |  | 3 | 4 |  |  |  | 5 | 6 | 7 |  |  | 8 |  | 9 | 10 | 11 | 12 | BLOCK CHANGES = 12 |
| BUFFER CHANGES |  | 1 |  |  |  | 2 |  |  |  |  |  |  | 3 |  |  |  |  | 4 |  |  |  | CALC EFFICIENCY |
|  |  |  |  |  |  |  |  |  |  |  |  |  |  |  |  |  |  |  |  |  |  | (5-1) / 12 = 33% |
|  |  |  |  |  |  |  |  |  |  |  |  |  |  |  |  |  |  |  |  |  |  |  |
| BUFFER A | 1 | 1 | 1 | 1 | 1 | 1 | 1 | 1 | 1 | 1 | 1 | 1 | 1 | 1 | 1 | 1 | 1 | 1 | 1 | 1 |  |  |
| BUFFER B |  | 2 | 2 | 2 | 2 | 2 | 2 | 2 | 2 | 2 | 2 | 2 | 2 | 2 | 2 | 2 | 2 | 5 | 5 | 5 |  |  |
| BUFFER C |  |  |  |  |  | 3 | 3 | 3 | 3 | 3 | 3 | 3 | 3 | 3 | 3 | 3 | 3 | 3 | 3 | 3 |  |  |
| BUFFER D |  |  |  |  |  |  |  |  |  |  |  |  | 4 | 4 | 4 | 4 | 4 | 4 | 4 | 4 |  | (5-1) / 4 = 100% WITH BUFFERS 4 |

FIG. 3B

| GROUP | ROWS READ | BLOCKS W/DATA | BLOCK MAX ROWS | BLOCK MIN ROWS | BLOCK AVG ROWS | PBC CHANGES | 100 MRB BLOCK EFF % | MAX ROW/BLK EFFICIENCY RATES WITH BUFFERS | | | | | | | | | | | | | | |
|---|---|---|---|---|---|---|---|---|---|---|---|---|---|---|---|---|---|---|---|---|---|---|
| REO REOK1 | | | | | | | | 2% | 4% | 8% | 12% | 16% | 20% | 24% | 28% | 32% | 48% | 64% | 96% | 128% | 256% |
| 1 | 3,600 | 365 | 26 | 1 | 10 | 720 | 14 | | | | | | | | | | | | | 17 | 19 |
| 2 | 3,600 | 387 | 30 | 1 | 9 | 857 | 12 | | | | | | | | | | | | | 13 | 15 |
| 3 | 3,600 | 448 | 36 | 1 | 8 | 724 | 14 | | | | | | | | | | | | | | 18 |
| 4 | 3,600 | 442 | 36 | 1 | 8 | 677 | 15 | | | | | | | | | | | | | | 19 |
| 5 | 3,600 | 711 | 16 | 1 | 5 | 872 | 11 | | | | | | | | | | 12 | | | | 14 |
| 6 | 3,600 | 602 | 24 | 1 | 6 | 867 | 11 | | | | | 12 | | | | | | | | | |
| 7 | 3,600 | 545 | 28 | 1 | 7 | 780 | 13 | | | | | | | | | | | | 14 | 15 | 16 |
| 8 | 3,600 | 642 | 34 | 1 | 6 | 833 | 12 | | | | | | | | | | | | | | 13 |
| 9 | 3,150 | 557 | 33 | 1 | 6 | 601 | 14 | 15 | | | | | | | | | | | | | 22 |

FULL TABLE

| | ROWS READ | BLOCKS W/DATA | MAX ROWS | MIN ROWS | AVG ROWS | PBC CHANGES | BLOCK EFF % | 2% | 4% | 8% | 12% | 16% | 20% | 24% | 28% | 32% | 48% | 64% | 96% | 128% | 256% |
|---|---|---|---|---|---|---|---|---|---|---|---|---|---|---|---|---|---|---|---|---|---|
| MRB | 31,950 | 888 | 36 | 18 | 36 | 6,931 | 13 | | | | | | | | | | | | | 14 | 16 |
| AMRB | 31,950 | 888 | 36 | 18 | 36 | 6,931 | 13 | | | | | | | | | | | | | 14 | 16 |

FIG. 4

| GROUP | ROWS READ | BLOCKS W/DATA | BLOCK MAX ROWS | BLOCK MIN ROWS | BLOCK AVG ROWS | PBC CHANGES | 100 MRB BLOCK EFF % | *----MAX ROW/BLK EFFICIENCY RATES WITH BUFFERS----* | | | | | | | | | | | | | | |
|---|---|---|---|---|---|---|---|---|---|---|---|---|---|---|---|---|---|---|---|---|---|---|
| | | | | | | | | 2 % | 4 % | 8 % | 12 % | 16 % | 20 % | 24 % | 28 % | 32 % | 48 % | 64 % | 96 % | 128 % | 256 % |
| REO REOK1 ← 402 | | | | | | | | | | | | | | | | | | | | | |
| 1 | 3,600 | 735 | 19 | 1 | 5 | 1,184 | 8 | | | | | | | | | | | | | | |
| 2 | 3,600 | 694 | 21 | 1 | 5 | 1,138 | 9 | | | | | | | | | | | | | | |
| 3 | 3,600 | 749 | 32 | 1 | 5 | 816 | 12 | | | | | | | | | | | | | | |
| 4 | 3,600 | 504 | 19 | 1 | 7 | 503 | 20 | | | | | | | | | | | | | | |
| 5 | 3,600 | 476 | 25 | 2 | 8 | 475 | 21 | | | | | | | | | | | | 9 | 11 | |
| 6 | 3,600 | 204 | 23 | 1 | 18 | 203 | 50 | | | | | | | | | | | | | | 14 |
| 7 | 3,600 | 201 | 28 | 1 | 18 | 200 | 51 | | | | | | | | | | | 21 | 22 | 24 | 32 |
| 8 | 3,600 | 195 | 36 | 5 | 18 | 194 | 53 | | | | | | | | | | | | | | |
| 9 | 3,600 | 203 | 27 | 8 | 18 | 202 | 50 | | | | | | | | | | | | | | |
| 10 | 37 | 3 | 18 | 6 | 12 | 2 | 50 | | | | | | | | | | | | | | |
| ← 404 | | | | | | | | | | | | | | | | | | | | | | |
| FULL TABLE | | | | | | | | | | | | | | | | | | | | | | |
| MRB | 32,437 | 1,796 | 36 | 1 | 18 | 4,917 | 18 | | | | | | | | | | 19 | 37 | | 38 | 21 |
| AMRB | 32,437 | 1,796 | 36 | 1 | 18 | 4,917 | 36 | | | | | | | | | | | 37 | | 38 | 42 |
| ← 406 | | | | | | | | | | | | | | | | | | | | | | |

FIG. 4A

| GROUP REO REOK1 | ROWS READ | BLOCKS W/DATA | *...BLOCK...* MAX ROWS | MIN ROWS | AVG ROWS | PBC BLOCK CHANGES | 100 MRB BLOCK EFF % | *....MAX ROW/BLK EFFICIENCY RATES WITH BUFFERS....* 2 4 8 12 16 20 24 28 32 48 64 96 128 256 % % % % % % % % % % % % % % |
|---|---|---|---|---|---|---|---|---|
| 1 | 3,600 | 100 | 36 | 36 | 36 | 100 | 100 | |
| 2 | 3,600 | 100 | 36 | 36 | 36 | 100 | 100 | |
| 3 | 3,600 | 100 | 36 | 36 | 36 | 100 | 100 | |
| 4 | 3,600 | 100 | 36 | 36 | 36 | 100 | 100 | |
| 5 | 3,600 | 100 | 36 | 36 | 36 | 100 | 100 | |
| 6 | 3,600 | 100 | 36 | 36 | 36 | 100 | 100 | |
| 7 | 3,600 | 100 | 36 | 36 | 36 | 100 | 100 | |
| 8 | 3,600 | 100 | 36 | 36 | 36 | 100 | 100 | |
| 9 | 3,600 | 100 | 36 | 36 | 36 | 100 | 100 | |
| 10 | 37 | 2 | 36 | 1 | 19 | 2 | 50 | |
| FULL TABLE | | | | | | | | |
| MRB | 32,437 | 902 | 36 | 1 | 36 | 902 | 100 | |
| AMRB | 32,437 | 902 | 36 | 1 | 36 | 902 | 100 | |

FIG. 5

SYSTEM AND METHOD FOR ANALYZING SEQUENTIAL DATA ACCESS EFFICIENCY

TECHNICAL FIELD

The invention relates to the field of relational database systems and products. More particularly, the invention relates to determining sequential access efficiency for relational database tables.

BACKGROUND

Relational database management systems provide data row storage options that allow data row storage to be varied from a selected native key sequence. Various data storage options may be utilized, for example, "clustered" (which attempts to place the data rows in native key sequence but allows some deviation if space becomes a concern), "sequential" (which places new data rows at the end of the existing space and when space is exhausted, wraps back to the front of a table and begins adding data rows there), "random" (which places data rows wherever there is available space). The "random" option is most commonly used because it consumes the least amount of resources.

For most indexed access of data rows, the actual data row order in the table has no effect on the performance of the database or the accessing application. However, various applications require access to large segments of data rows using a sequential (read next) process. In these cases, the native key sequence may be selected to access the data rows.

Over a period of time with additions and deletions of data rows from the database table, the data row sequence becomes disorganized. When this disorganization occurs, the application accessing the data rows according to native key sequence slows because the database management system is required to perform substantially more physical IOs to retrieve the data rows in the native key sequence.

In order to re-order the data rows according to the native key sequence, database reorganization processes may be regularly scheduled. However, database reorganizations may be resource-intensive and in some cases unnecessary. In these cases, database resources may be wasted when reorganizing database tables that do not need reorganization. Thus, what is needed is a low cost (resource-wise) way to determine whether at least a portion of a sequential-access database will benefit from reorganization.

These and other drawbacks exist.

SUMMARY

Various systems, computer program products, and methods for determining sequential access efficiency for a database table are described herein.

According to various implementations of the invention, the method may include a plurality of operations. In some implementations, the operations may include determining a sequential access of a plurality of rows of a database table, wherein the plurality of rows are stored using a plurality of data blocks, and wherein the sequential access occurs when at least a portion of the database table is accessed. In some implementations, the operations may include determining a number of data block changes that occur during the sequential access of the plurality of rows in the database table, wherein a data block change occurs when a current row is stored in a first data block and a next row is stored in a second data block that is different from the first data block such that accessing the next row after accessing the current row results in the data block change. In some implementations, the operations may include determining a sequential access efficiency based on the determined number of data block changes.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

FIGS. 2A and 2B illustrate exemplary charts depicting sequential access efficiency, according to various aspects of the invention.

FIGS. 3A and 3B illustrate exemplary charts depicting buffered sequential access efficiency, according to various aspects of the invention.

FIGS. 4, 4A and 5 illustrate exemplary reports generated by a database management system, according to various aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
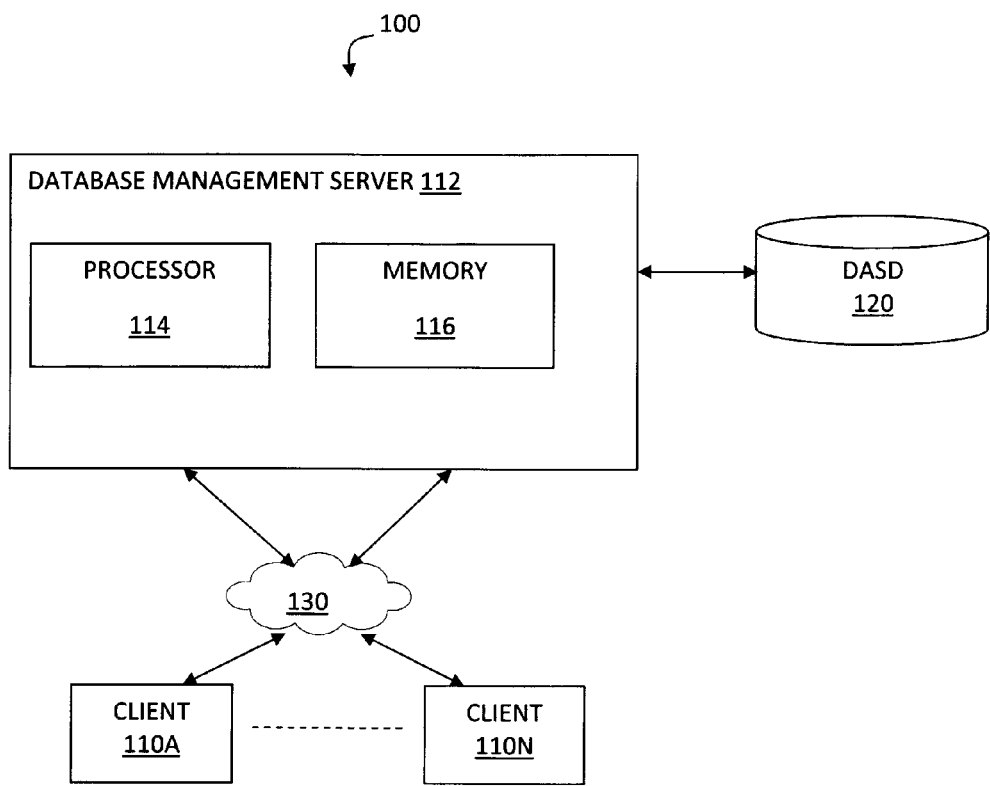
FIG. 1 illustrates an exemplary database management system, according to various aspects of the invention.

FIG. 1 is an exemplary illustration of a database management system 100, according to an aspect of the invention. Database management system 100 may include, among other things, at least a database management server 112 that is configured to manage one or more relational databases and/or indexes for the relational databases. Database management server 112 may be communicatively coupled to one or more data storage access devices (DASD) 120 that may store/maintain one or more database tables associated with relational database(s), store/maintain one or more indexes for the tables in the database(s), and/or other data structures. In some implementations, database management server 112 may be communicatively coupled to a client device 110 (illustrated in FIG. 1 as a plurality of client devices 110A, . . . , 110N). Database management server 112 may be coupled to client device 110 via a network 130. Network 130 may include a Local Area Network, a Wide Area Network, a cellular communications network, a Public Switched Telephone Network, and/or other network or combination of networks.

In some implementations, database management server 112 may include a processor 114, a memory 116, and/or other components that facilitate the functions of database management server 112. In some implementations, processor 114 includes one or more processors configured to perform various functions of database management server 112. In some implementations, memory 116 includes one or more tangible (i.e., non-transitory) computer readable media. Memory 116 may include one or more instructions that when executed by processor 114 configure processor 114 to perform functions of database management server 112. In some implementations, memory 116 may include one or more instructions stored on tangible computer readable media that when executed at a remote device, such as client device 110, cause the remote device to display at least one report, as described herein.

Database administrators (or other users) may interact with the database management server 112 via client device 110. In some implementations, client device 110 may include a computing/processing device such as a desktop computer, a laptop computer, a network computer, a wireless phone, a personal digital assistant, a tablet computing device, workstation, and/or other computing devices that may be utilized to interact with database management server 112. In some implementations, client device 110 may comprise a user interface (not otherwise illustrated in FIG. 1) that may enable users to perform various operations that may facilitate interaction with database management server 112 including, for example, providing requests to retrieve information from database tables, create tables, add/delete/update rows/columns in database tables, create/delete/update/access one or more indexes associated with the database tables, providing requests for determining sequential access efficiency for database tables, providing requests to generate one or more reports associated with the database tables, receiving one or more reports associated with the database tables and displaying the reports, and/or performing other operations. Client device 110 may include a processor (not otherwise illustrated in FIG. 1), circuitry, and/or other hardware operable to execute computer-readable instructions.

In some implementations, database management server 112 may manage various operations performed on the relational database(s) stored in DASD 120 and/or one or more database tables in the relational database(s). For example, database management server 112 may receive requests (for example, user requests, and/or other requests) to create table(s), add row(s)/column(s), delete row(s)/column(s), update row(s)/column(s), retrieve information from row(s)/column(s), and/or other requests. Database management server 112 may convert the requests to queries that may be run against the relational database(s) and may accordingly create one or more tables in the database(s), add one or more rows/columns to the tables in database, delete one or more rows/columns from the tables in database, update one or more rows/columns in the tables in database, retrieve requested information from the tables in database, and/or perform other operations. In order to retrieve requested information from the database, database management server 112 may access one or more tables specified by the query (and/or request) to determine the information within the tables that matches a given request criteria specified in the query. Database management server 112 may then retrieve the determined information from the tables and provide it to the user.

In some implementations, database management server 112 may manage creation, deletion, updating, access, and/or other operations associated with one or more indexes for the tables in the relational database(s). Database management server 112 may create one or more indexes on one or more columns of one or more tables. An index entry may refer to one entry or index value that is in the index and references a given data row(s) of the database table. An index entry may consist of the value(s) contained in the column(s) being indexed for a given data row, and a pointer to the data row. The data row pointer may consist of a data block number/id within which the data row resides, and the unique row id. Most access requests within the relational database environment are based on index access. Index access typically refers to the pre-definition of a specific access path that is created using the value(s) of data column(s). Once created, the database can quickly retrieve data rows that have an index entry (data column value) that matches a given request criteria. In some implementations, the indices may be stored in a physical area in the DASD 120.

When a data row is added to an indexed table, database management server 112 may create an index entry in the index associated with the indexed table using the data value of the indexed column(s). Similarly, when a data row is deleted from or updated in an indexed table, database management server 112 may delete the appropriate index entry from the index or update the appropriate index entry in the index (for example, if the indexed column data value is changed/updated). When a request to retrieve particular information from a table in a database is received by database management server 112 (for example, in the form of search queries specifying an indexed column), database management server 112 may perform an index access to determine one or more index entries that include data values associated with the indexed column and/or that satisfy the request. Database management server 112 may identify data row pointers from the determined index entries that identify or serve as pointers to a specific data row(s) stored in DASD 120. Database management server 112 may accordingly retrieve one or more data rows associated with the data row pointers from DASD 120.

In some implementations, data rows in the tables may be accessed using a specific index value ("key"). Data rows may be indexed according to one or more keys, allowing rows to be accessed using one or more index paths. The order of keys in a particular index may be referred to as a "key sequence" for that particular index. One of these indices may be selected to correspond to the physical storage order of the data rows in order to facilitate retrieval from DASD 120. Such an index may be referred to as a "native key sequence" and may be used when the entire content of the database or some portion thereof is accessed in a sequential process.

In some implementations, database management server 112 may manage the placement/storage of a plurality of data rows in a physical data area in the DASD 120. The physical data area may be separate from where the indices are stored. The plurality of data rows may be stored using a plurality of data blocks (i.e., physical blocks in DASD 120).

In some implementations, database management server 112 may store an initial set of data rows according to the native key sequence. As data rows are added, deleted, and/or updated by database management server 112 and/or data blocks in DASD 120 are reused, the order of data rows in DASD 120 (i.e., data row sequence) may become disorganized. In other words, the data rows may no longer be stored according to the native key sequence (i.e., the data rows may no longer be stored in the same order as the native key sequence). This disorganization may adversely affect applications running on database management server 112 that require batch processing of rows (for example, online billing applications, catalog creating applications, and/or other applications). These applications may require at least a portion of the database table to be accessed using a sequential (read next) process. In these cases, the native key sequence may be selected to access the data rows. When disorganization of the data row sequence occurs, accessing according to the native key sequence slows because the database management server 112 may be required to perform substantially more accesses to the physical data blocks (i.e., physical IOs) to retrieve data rows in the native key sequence from the data blocks.

In some implementations, database management server 112 may receive a user request (or other request) to determine a sequential access efficiency for a database table. In some implementations, the request may include one or more parameters identifying the database table for which the sequential access efficiency is to be determined, a native key sequence for the database table, reference group size, and/or other parameters. In some implementations, the sequential access efficiency may indicate how close the data row sequence associated with a selection of rows is to the native key sequence when the selection of rows is read in sequential order.

In some implementations, database management server 112 may determine a sequential access of a plurality of rows of a database table, wherein the sequential access occurs when at least a portion of the database table is accessed. In some implementations, database management server 112 may determine the sequential access in response to the request. In some implementations, determining a sequential access may include determining a sequential access while the database is online. In some implementations, determining a sequential access may include determining a sequential access while the database is offline. In some implementations, determining a sequential access may include accessing the plurality of rows of the database table sequentially according to the native key sequence. In some implementations, determining a sequential access efficiency may include using a buffer pool managed by a least recently used (LRU) algorithm to determine how the data blocks stored in a plurality of data buffers may improve the sequential access efficiency.

In some implementations, database management server 112 may determine a number of data block changes that occur during the sequential access of the plurality of rows in the database table. In some implementations, database management server 112 may determine the number of data block changes in response to the request. In some implementations, a data block change may occur when a current data row is stored in a first data block and a next row is stored in a second data block that is different from the first data block such that accessing the next row after accessing the current row results in the data block change. In other words, a data block change may refer to the change that occurs when a next data row (accessed according to the native key sequence) is on a data block which is not the same data block that a current data row is on. In some implementations, determining a number of data block changes may include determining a number of times a data block change occurs during a sequential pass (ascending) of the index values associated with the native key sequence.

In some implementations, database management server 112 may determine a sequential access efficiency based on the determined number of data block changes. In some implementations, database management server 112 may determine the sequential access efficiency in response to the request. In some implementations, the sequential access efficiency for the database table may be based on a determined number of data block changes and a number of data blocks that contain data. In some implementations, database management server 112 may determine the number of data blocks that contain data.

In some implementations, in an ordered database table, the number of data block changes when processing/accessing all of the data rows by native key sequence equals the number of data blocks with at least one data row in them minus one (minus 1). FIG. 2A illustrates an exemplary chart depicting sequential access efficiency for an ordered database table. The data rows are in native key sequence order in the data blocks and there are five data blocks in use (i.e. 5 data blocks that contain data). Rows 1-5 are in data block 1, rows 6-10 are in data block 2, rows 11-15 are in data block 3, rows 16-20 are in data block 4, and row 21 is in data block 5. Sequential processing/accessing of these data rows (according to native key sequence) would result in 4 data block changes because each data block would be accessed once, and all data rows would be retrieved on that data block before moving to the next data block. For example, as depicted in FIG. 2A, a first block change occurs after rows 1-5 have been accessed (i.e. change from data block 1 to data block 2), a second block change occurs after rows 6-10 have been accessed (i.e. change from data block 2 to data block 3), a third block change occurs after rows 11-15 have been accessed (i.e. change from data block 3 to data block 4), and a fourth block change occurs after rows 16-20 have been accessed (i.e. change from data block 4 to data block 5).

In some implementations, the sequential access efficiency may be determined by the following equation:

$$(N_B-1)/N_C \qquad (1),$$

where $N_B$ represents the number of blocks with data and $N_C$ represents the number of block changes that occurred or will occur during sequential access of the data rows.

Thus, the database table of FIG. 2A is determined to have a 100% sequential access efficiency because $(5-1)/4=100\%$.

FIG. 2B illustrates an exemplary chart depicting sequential access efficiency for an unordered database table (i.e., the data rows are not in native sequence order in the data blocks). Row 1 is in data block 1, row 2 is in data block 2, rows 3-5 are in data block 1, row 6 is in data block 3, rows 7-10 are in data block 2, row 11 is in data block 1, row 12 is in data block 3, rows 13-15 are in data block 4, rows 16-17 are in data block 3, row 18 is in data block 4, row 19 is in data block 5, row 20 is in data block 4, and row 21 is in data block 3. Sequential processing/accessing of these data rows would result in 12 data block changes which means that on average each data block would be accessed three times in order to process/access the data rows according to the native sequence order. For example, as depicted in FIG. 2B, a first block change occurs after row 1 has been accessed (i.e. change from data block 1 to data block 2), a second block change occurs after row 2 has been accessed (i.e. change from data block 2 back to data block 1), a third block change occurs after rows 3-5 have been accessed (i.e. change from data block 1 to data block 3), a fourth block change occurs after row 6 has been accessed (i.e. change from data block 3 to data block 2), a fifth block change occurs after rows 7-10 have been accessed (i.e., change from data block 2 to data block 1), a sixth block change occurs after row 11 has been accessed (i.e., change from data block 1 to data block 3), a seventh block change occurs after row 12 has been accessed (i.e. change from data block 3 to data block 4), an eighth block change occurs after rows 13-15 have been accessed (i.e., change from data block 4 to data block 3), a ninth block change occurs after rows 16-17 have been accessed (i.e., change from data block 3 to data block 4), a tenth block change occurs after row 18 has been accessed (i.e., change from data block 4 to data block 5), an eleventh block change occurs after row 19 has been accessed (i.e., change from data block 5 to data block 4), and a twelfth block change occurs after row 20 has been accessed (i.e., change from data block 4 to data block 3).

Based on equation 1 above, the database table of FIG. 2B is determined to have a 33% sequential access efficiency because $(5-1)/12=33\%$.

When the sequential access efficiency for the database table is low, sequential access of the database table is likely to take more physical IOs than when the sequential access efficiency is high for the same data. This is because each block change may require physical IOs for processing. Therefore, more CPU consumption is required to complete the sequential access when the sequential access efficiency is low than when the sequential access efficiency is high. Lower physical processing results in lower CPU consumption and lower elapsed times. Accordingly, when sequential access efficiency is low, a data reorganization may be helpful. On the other hand, when sequential access efficiency is high, a data reorganization may be unnecessary. As would be appreciated, "high" and "low" efficiency may be relative and can be defined according to particular needs.

In some implementations, database management server 112 may utilize large buffer pools (for example, in memory 116) for storing one or more data blocks as they are accessed/read such that the data blocks may be accessed multiple times as long as they remain in the buffers. Applications/tasks running on database management server 112 may have a number of data buffers associated with the tasks. Associating a number of buffers to a given application/task may improve efficiency and reduce the number of times a data block will need to be retrieved/accessed during sequential processing. In other words, using buffers may reduce physical IO required for a block change. For example, when data block 1 is accessed and placed in a buffer, returning back to data block 1 to retrieve a row may not result in a physical IO in response to the block change because data block 1 is still available in memory (buffer), thus reducing the impact or cost of the data block change.

In some implementations, database management server 112 may determine a buffered sequential access efficiency for the database table based on a number of available buffers. In some implementations, database management server 112 may determine a buffered sequential access of a plurality of rows of a database table based on a number of buffers used to buffer the buffered sequential access. In some implementations, determining a buffered sequential access may include accessing the plurality of rows of the database table sequentially according to the native key sequence and determining utilizing a set number of buffers. In some implementations, database management server 112 may determine a number of block changes that occur during the buffered sequential access.

For example, if data rows have been sequentially accessed and those rows resided in four sequentially arranged data blocks (i.e., blocks 1, 2, 3, and 4) and there are 2 buffers (Buffers A and B) being managed by a LRU (Least Recently Used) algorithm, blocks 3 and 4 would be maintained in buffers A and B, respectively. In other words, blocks 3 and 4 would be maintained in memory 116. The last data row accessed was in block 4. If the next data row to be accessed is in block 3, a data block change would occur but not be counted as a block change because block 3 is still in memory (in Buffer A, for example). However, if the next data row to be accessed is in block 2, a data block change would occur and be counted since block 2 is not in a buffer (in memory) and a physical IO would be needed to retrieve block 2 from DASD 120. In a LRU managed buffer pool, the access of block 2 would load block 2 into the oldest buffer (i.e. Least Recently Used). In some implementations, the block change count may be significantly lower for a buffered sequential access. As such, when a number of buffers are available for a task, a data block change is not counted if a new block number that is being accessed would have been in a buffer associated with the task.

As would be appreciated, a particular buffer may store different numbers of data blocks. Furthermore, LRU managed buffer pools are described for illustrative purposes and not limitation. Other types of buffer pools (memory) may be used.

FIG. 3A illustrates an exemplary chart depicting buffered sequential access efficiency for the database table depicted in FIG. 2B with two buffers. In some implementations, the buffers may be managed by a LRU (least recently used) algorithm. As illustrated in FIG. 3A, even though there still are 12 logical data block changes, database management server 112 accesses the data blocks only 8 times (depicted as buffer changes in FIG. 3A). In other words, instead of 12 data block changes, there are eight data block changes with two buffers because one or more data blocks do not have to be retrieved from DASD 120 every time there is a data block change. As such, based on equation (1) above, the database table of FIG. 3A with two buffers is determined to have a 50% buffered sequential access efficiency because (5−1)/8=50%, which is an improvement over the sequential access efficiency of 33%.

FIG. 3B illustrates an exemplary chart depicting buffered sequential access efficiency for the database table depicted in FIG. 2B with four buffers. In some implementations, the buffers may be managed by a LRU (least recently used) algorithm. As illustrated in FIG. 3B, even though there still are 12 logical data block changes, database management server 112 accesses the data blocks only 4 times (depicted as buffer changes in FIG. 3B). In other words, instead of 12 data block changes, there are four data block changes with four buffers. As such, based on equation (1) above, the database table of FIG. 3B with four buffers is determined to have a 100% buffered sequential access efficiency because (5−1)/4=100%.

In some implementations, database management server 112 may generate one or more reports. In some implementations, database management server 112 may generate the report(s) in response to the request. A report, among other things, may include the determined sequential access efficiency for the database table, and the determined buffered sequential access efficiency for the database table utilizing one or more numbers of buffers (for example, buffered sequential access efficiency with 2 buffers, 4 buffers, 8 buffers, and so on).

FIG. 4 depicts an exemplary report generated by database management server 112, according to various aspects of the invention. FIG. 4 and other figures illustrating an example of a report is for illustrative purposes only and should not be viewed as limiting. The report may include various formats and configurations while including or excluding some header items and values illustrated and adding other header items and values not otherwise illustrated in the figure as would be appreciated.

In some implementations, the report may have three sections 402, 404, and 406. Section 402 may describe the report header that provides information about the database table being processed. "REO" may indicate the name of the database table being processed. "REOK1" may indicate the name of the native key sequence for the database table. "GROUP" may indicate a particular reference group being processed. In some implementations, a reference group may include a group of rows. "ROWS READ" may indicate the number of rows in the particular reference group. "BLOCKS WITH DATA" may indicate a number of data blocks that have at least one data row from the particular reference group. "MAX ROWS" may indicate a maximum number of rows found on any data block in the particular reference group. "MIN ROWS" may indicate a minimum number of rows found on any data block in the particular reference group. "AVERAGE ROWS" may indicate an average number of rows per data block. "BLOCK CHANGES" may indicate an actual number of block changes that occurred when processing the data rows in the particular reference group in sequential order (i.e., according to native key sequence"). "MRB (maximum rows per block) efficiency" may indicate the sequential access efficiency for the particular reference group. "MRB (Maximum row per block) efficiency rates with buffers" may indicate the buffered sequential access efficiency for the particular reference group. "PBC" may indicate a block count for a particular reference group. In some implementations, PBC may indicate a data block change number that would give 100% sequential access efficiency. In some implementations, as the data rows in the reference groups are processed, the actual number of data block changes that occur is compared against the PBC to determine the sequential access efficiency.

In some implementations, section 404 may provide detailed information regarding each reference group associated with the database table. As illustrated in FIG. 4, the total number of rows (indicated as 31,960 in section 406) in the database table is divided into 9 reference groups. Reference groups 1-8 each have 3,600 rows per group and reference group 9 has 3,160 rows.

In some implementations, a reference group may be defined as a grouping of rows where the rows are included in the reference group according to their native sequence key value. In these implementations, the reference group is not a grouping by physical location but rather a grouping by logical order according to the native sequence key. Referring to FIG. 4, for example, reference group 1 may include the first 3,600 rows in the database table according to native key value (ascending). Reference group 2 may have the next 3,600 rows according to native sequence key, and so on. Since the reference group is a logical grouping, the data rows in the groups may be spread across many physical data blocks. For a data block to be part of the reference group it will have at least 1 row from the reference group on the data block. In some implementations, a given physical data block may contain rows from many different reference groups.

In some implementations, the sequential efficiency may be determined for each reference group processed. This may be relevant in database implementations where reorganization processes can be focused on a specific portion of the database table. In these implementations, having the information on each reference group may indicate that only part of the table should be reorganized. In some implementations, the sequential efficiency rating may be produced for the entire table (without respect to reference groups).

Reference group 1, for example, has 3,600 rows and 365 data blocks with at least one data row in them. The maximum number of rows found on any data block in reference group 1 is 26. The minimum number of rows found on any data block in reference group 1 is 1. The average number of rows per data block in reference group 1 is 10. The number of block changes that occurred when processing the data rows in reference group 1 in sequential order (i.e., according to native key sequence) is 720. In some implementations, the number 720 represents the actual number of data block changes that occurred when the data rows are processed.

In some implementations, the actual number of data block changes may be compared against PBC (perfect block count) to determine the sequential access efficiency. In some implementations, database management server 112 may determine PBC based on the following equation:

$$N_R/N_{Max})-1 \qquad (2),$$

Where $N_R$ represents a number of rows per reference group and $N_{Max}$ represents a maximum number of rows that will fit on a data block.

In some implementations, database management server 112 may determine/calculate the maximum number of rows that will fit on a data block. For the reference groups of FIG. 4, the maximum number of rows that will fit on a data block (MRB) may be determined as 36, for example. In some implementations the maximum rows per block for a fixed length data row (not compressed) may be calculated by determining the number of data rows that could fit into the data block. In some implementations, this calculation may be based on the following equation:

$$(MRB=ABS/RL) \qquad (3),$$

where ABS represents the size of the data block minus any bytes used for block management and RL represents the stored length of the data row including any bytes that the database management system adds onto the row for management purposes. The calculated MRB value may be rounded to a whole number. Thus, for reference group 1, for example, the number of data blocks (if filled to maximum number of rows which is MRB=36) that would hold 3,600 rows would be 3,600/36=100. In some implementations, the maximum rows per block for a variable length data row (usually compressed) may be determined by physically scanning a set of data blocks and determining the number of data rows that are actually on the data block. The block with the highest data row content may be used as the value for MRB.

In some implementations, PBC is determined to be RGR/MRB. Where RGR is the number of rows in the reference group, MRB is the maximum rows per block. Referring to FIG. 4, for reference groups 1-8 PBC=3600/36=100 (depicted as PBC 100 in section 402). Referring to FIG. 4, reference group 9 encompasses the remaining data rows at the high end of the index and therefore may not be a full size reference group. For this last reference group the PBC is calculated as PBC=3150/36=88. In these implementations, PBC may indicate a data block change number that would give 100% sequential access efficiency. This means that assuming that the data rows in a reference group 1-8 are arranged according to native key sequence, to read/process the 3,600 data rows on 100 data blocks in each reference group, 100 block changes would be required. This means that assuming that the data rows in a reference group 9 are arranged according to native key sequence, to read/process the 3,150 data rows on 88 data blocks in each reference group, 88 block changes would be required.

In some implementations, the sequential access efficiency (MRB efficiency) for each reference group may be determined. In some implementations, database management server 112 may determine the sequential access efficiency based on the following equation:

$$PBC_R/N_{BC} \qquad (4),$$

where $PBC_R$ represents PBC per reference group and $N_{BC}$ represents an actual number of block changes per reference group.

Thus, for reference group 1, for example, the sequential access efficiency may be determined as 100/720=14%

In some implementations, database management server 112 may determine the buffered sequential access efficiency (MRB efficiency with buffers) for each reference group. For reference group 1, for example, FIG. 4 depicts that the buffered sequential access efficiency with 128 buffers is 17%, with 256 buffers is 19. In FIG. 4, the buffered sequential access efficiency values are only displayed if the determined value with buffers is higher that a previous entry for the reference group. It will be appreciated, however, that the buffered sequential access efficiency may be determined and displayed for all the other sets of buffers (2, 4, 8, 12, 16, 20, 24, 28, 32, 64, and 96) without departing from the spirit of the invention.

While the above paragraphs describe values and computations for reference group 1, similar computations may be performed for reference groups 2-9 and displayed in section 404, as depicted in FIG. 4.

In some implementations, section 406 may provide reference group information for the complete database table. For example, the database table is treated as a reference group that has 31,950 rows and 888 data blocks with at least one data row in them. In these implementations, this final reference group is not a summarization of the results of the previous reference groups. It is a separate analysis of the table as a single reference group where every row in the table is part of the reference group. The maximum number of rows found on any data block in the database table is 36. The minimum number of rows found on any data block in the database table is 18. The average number of rows per data block in the database table is 36. The actual number of block changes that occurred when processing the data rows in the database table in sequential order (i.e., according to native key sequence") is 6,931.

In some implementations, the sequential access efficiency for the database table may be determined. In some implementations, database management server 112 may determine the sequential access efficiency for the database table based on the following equation:

$$PBC_T/N_T \quad (5),$$

Where $PBC_T$ represents PBC for the database table and $N_T$ represents actual number of block changes for the database table.

In some implementations, $PBC_T$ may be determined based on the following equation:

$$(N_r/R_{max})-1 \quad (6),$$

Where Nr represents number of rows per database table and Rmax represents actual maximum rows per block.

Thus, the sequential access efficiency for the database table may be determined as (31,950/36)/6,931=13%.

In some implementations, database management server 112 may determine, while processing the entire table, the actual maximum number of rows per block. For calculations where the full database table is being reviewed Rmax as shown above is preferable to the calculated MRB. In this example calculated MRB and actual MRB is the same (36).

In some implementations, database management server 112 may determine the buffered sequential access efficiency for the database table. For example, FIG. 4 depicts that the buffered sequential access efficiency for the database table with 128 buffers is 14%, with 256 buffers is 16%. In FIG. 4, the buffered sequential access efficiency values are only displayed if the determined value with buffers is higher that a previous entry for the database table. It will be appreciated, however, that the buffered sequential access efficiency may be determined and displayed for all the other sets of buffers (2, 4, 8, 12, 16, 20, 24, 28, 32, 48, 64, and 96) without departing from the spirit of the invention.

In some implementations, database management server 112 may determine a adjusted sequential access efficiency (AMRB) for the database table (depicted in the second line in section 406). In some implementations, the adjusted sequential access efficiency may be determined based on the actual number of blocks with data. The adjusted sequential access efficiency may be determined by the following equation:

$$PBC_A/N_{BC} \quad (7),$$

Where $PBC_A$ represents an adjusted PBC for the database table and $N_{BC}$ represents the actual number of block changes for the database table.

In some implementations, $PBC_A$ may be determined based on the following equation:

$$\text{Blocks with data}-1 \quad (8).$$

Thus, the adjusted sequential access efficiency for the database table may be determined as (888)/6,931=13%.

In some implementations, the adjusted sequential access efficiency differs from the MRB access efficiency in that the adjusted sequential efficiency does not penalize the efficiency rating for data blocks that are not completely full (MRB). In other words, at the database table level MRB sequential efficiency is based on the all data rows being in order (by native sequence key) and all data blocks having the maximum number of rows per block. The adjusted sequential efficiency is based on the data row order by native key. Referring to FIG. 4, section 406, in these implementations, the MRB efficiency (first line) and the adjusted sequential efficiency (second line) are the same because the data blocks are full (of rows). In the example FIG. 4A, the same information is displayed and calculated for the table in the section 402 and 404. However, in this figure the REO table has had significant data row additions and deletions of data rows which has spread the data rows across more data blocks. This is evidenced by the fact that the average rows per block in section 406 has dropped from 36 (in FIG. 4) to 18 in (FIG. 4A). In FIG. 4A section 406 we now see that the MRB Efficiency rating may be determined as (32,437/36)/4,917=18% while the adjusted MRB Efficiency rating may be determined as (1796)/4,917=36%.

In some implementations, database management server 112 or a database administrator (or other user) may determine whether a database reorganization process for one or more reference groups and/or the complete database table should be performed. In some implementations, the determination may be based on the sequential access efficiency and/or the buffered sequential access efficiency values. In some implementations, a determination that a reorganization should be performed is made when the sequential access efficiency and/or the buffered sequential access efficiency reaches below a particular threshold (for example, less than 50%). In some implementations, the determination may be based on the information included in the generated report. In some implementations, based on the report of FIG. 4A for example, the low sequential access efficiency for the reference group(s) and/or table combined with the low buffered sequential access efficiency for the reference group(s) and/or table indicates that a data reorganization process should be performed.

In some implementations, the sequential access efficiency and/or buffered sequential access efficiency values provide an efficient and accurate method for determining whether a database reorganization process should be performed. This may reduce the number of database outages or other disruptions to perform unnecessary reorganizations. Reducing the number of resources consumed by unnecessary reorganizations may improve the overall 24×7 database availability.

In some implementations, in response to a determination that a database reorganization process should be performed, database management server 112 may trigger the database reorganization process for the reference group(s), the database table, and/or other segment or grouping of the database. In some implementations, the database reorganization process may extract the data rows from the reference group(s), table, and/or other segment, re-order the data rows according to the native key sequence, and replace the ordered data rows into the reference group(s), table, and/or other segment.

FIG. 5 depicts an exemplary report generated by database management server 112 after the database reorganization process on the reference group(s) and/or database table of FIG. 4A has been performed, according to various aspects of the invention. As illustrated in FIG. 5, the sequential access efficiency and/or the buffered sequential access efficiency for the reference group(s) and the database table is 100% because the data row sequence follows the native key sequence. In some implementations, the report of FIG. 5 may depict the sequential access efficiency and the buffered sequential access efficiency after an offline database reorganization process is performed. In implementations where an online database reorganization is utilized, the results may not reach 100% efficiency. This is due to limitations on how thoroughly the data can be reorganized while it is still being actively updated by users.

In some implementations, the reports of FIGS. 4, 4A and 5 may be generated while the database is online (i.e., open for processing).

In some implementations, a report generated after an online database reorganization process is performed may indicate an amount of improvement the online reorganization process provided based on the sequential access efficiency and/or buffered sequential access efficiency values. Also, these values may further may be used to determine whether another online database reorganization should be performed.

In some implementations, database tables and/or data rows in the database tables may be compressed by database management server 112 before storing them on DASD 120 in the form of, for example, compressed data rows in the data blocks. Thus, the various operations described above may be performed by database management server 112 on the compressed tables/rows. Because the amount of compression found in each data row will vary, the efficiency rating process may use the alternative scanning method (as described above) to determine the MRB value for the reference group analysis (FIG. 4 section 404). The actual MRB value is known for the full table (FIG. 4 Section 406) calculations. While compressed rows may add a certain amount of variance to the reference group calculations, the efficiency estimates will be within reason and the full table MRB and AMRB will reflect the table's actual efficiency.

Figure 6:
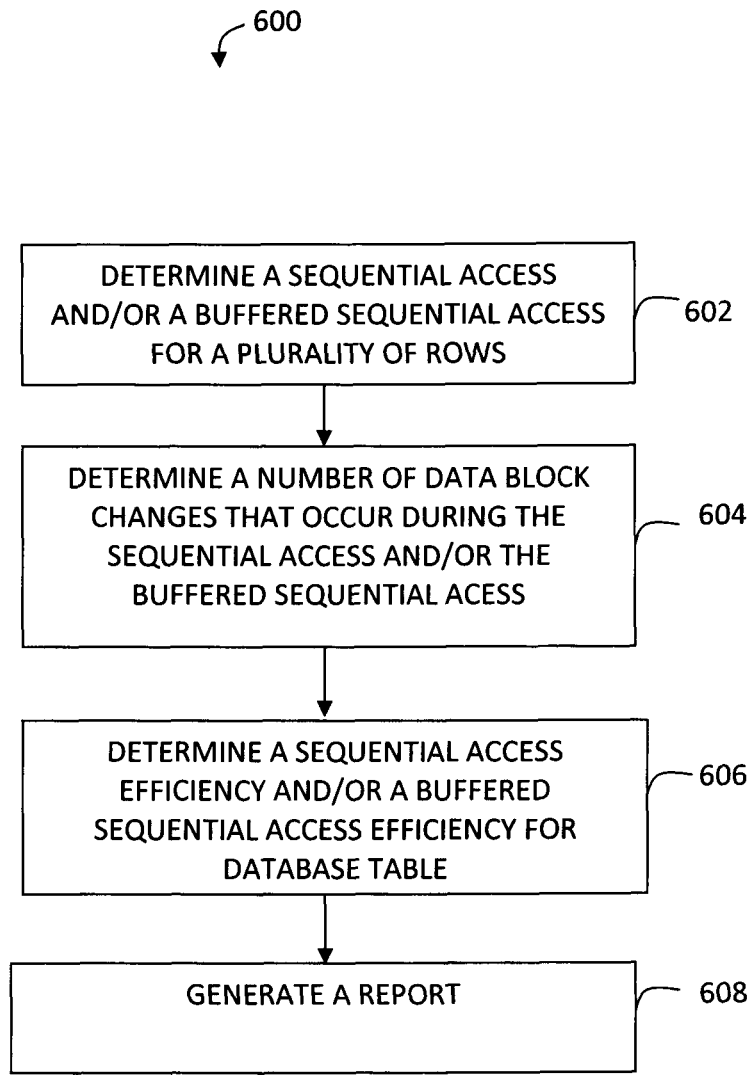
FIG. 6 is a flowchart depicting example operations performed by a database management system to determine sequential access efficiency for a database table, according to various aspects of the invention.

FIG. 6 is a flowchart 600 depicting example operations performed by a database management server 112 to determine sequential and/or buffered sequential access efficiencies, according to various aspects of the invention. The various processing operations depicted in FIG. 6 are described in greater detail herein. The described operations for a flow diagram may be accomplished using some or all of the system components described in detail above and, in some implementations of the invention, various operations may be performed in different sequences. In some implementations, additional operations may be performed along with some or all of the operations shown in FIG. 6. In yet other implementations, one or more operations may be performed simultaneously. In yet other implementations, one or more operations may not be performed. Accordingly, the operations described are exemplary in nature and, as such, should not be viewed as limiting.

In operation 602, process 600 may determine a sequential access and/or a buffered sequential access for a plurality of rows of a database tables. In some implementations, a sequential access occurs when at least a portion of the database table is accessed. In some implementations, determining a sequential access may include accessing the plurality of rows of the database table sequentially according to the native key sequence. In some implementations, determining a sequential access may include using a least recently used (LRU) algorithm to determine how the data blocks storing the plurality of rows have been accessed.

In some implementations, process 600 may determine a buffered sequential access of a plurality of rows of a database table based on a number of buffers used to buffer the buffered sequential access (for example, 2 buffers, 4 buffers, 8 buffers, and so on). In some implementations, determining a buffered sequential access may include accessing the plurality of rows of the database table sequentially according to the native key sequence utilizing a set number of buffers.

In operation 604, process 600 may determine a number of data block changes that occur during the sequential access of the plurality of rows in the database table. In some implementations, process 600 may determine a number of data block changed that occur during the buffered sequential access of the plurality of rows in the database table.

In operation 606, process 600 may determine a sequential access efficiency and/or a buffered sequential access efficiency for the database table. In some implementations, determining a sequential access efficiency for the database table may include determining the sequential access efficiency based on the determined number of data block changes that occur during the sequential access. In some implementations, determining a buffered sequential access efficiency for the database table may include determining a buffered sequential access efficiency based on the determined number of data block changes that occur during the buffered sequential access and the number of data buffers utilized to buffer the first buffered sequential access.

In operation 608, process 600 may generate a report. In some implementations, the generated report may include the determined sequential access efficiency and/or the determined buffered sequential access efficiency based on the number of buffers (for example, 2 buffers, 4 buffers, 8 buffers, and so on).

In some implementations, one or more operations of process 600 may be performed in response to a user request (or other request) to determine a sequential access efficiency and/or buffered sequential access efficiency for a database table, or in response to a user request (or other request) to generate a report describing the sequential access efficiency and/or buffered sequential access efficiency for a database table. In some implementations, the request(s) may include one or more parameters identifying the database table for which the sequential access efficiency is to be determined, a native key sequence for the database table, reference group size, and/or other parameters.

In some implementations, one or more operations of process 600 may be performed while the database is online. In some implementations, one or more operations of process 600 may be performed while the database is offline.

Implementations of the invention may be made in hardware, firmware, software, or various combinations thereof. Implementations of the invention may also be implemented as computer-readable instructions stored on a tangible computer-readable storage medium which may be read and executed by one or more processors. A tangible computer-readable storage medium may include any tangible, non-transitory, mechanism for storing or transmitting information in a form readable by a machine (e.g., a computing device). For example, a tangible computer-readable storage medium may include read only memory, random access memory, magnetic disk storage media, optical storage media, flash memory devices, and/or other tangible storage media. Intangible machine-readable transmission media may include intangible forms of propagated signals, such as carrier waves, infrared signals, digital signals, and/or other intangible transmission media. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention.

Other embodiments, uses and advantages of the invention will be apparent to those skilled in the art from consideration of the specification and practice of the invention disclosed herein. The specification and drawings should be considered exemplary only, and the scope of the invention is accordingly intended to be determined solely by the appended claims.

What is claimed is:

1. A computer-implemented method of determining sequential access efficiency for a database table, the method executed by a processor to perform a plurality of operations, the operations comprising:
    determining a sequential access of a plurality of rows of a database table, wherein the plurality of rows are stored using a plurality of data blocks, and wherein the sequential access occurs when a portion of the database table is accessed;
    determining a number of data block changes that occur during the sequential access of the plurality of rows in the database table, wherein a data block change occurs when a current row is stored in a first data block and a next row is stored in a second data block, different from the first data block, such that accessing the next row after accessing the current row results in the data block change; and
    calculating a sequential access efficiency based on the determined number of data block changes, wherein calculating the sequential access efficiency is performed using the following equation:

$(N_B-1)/N_C$ wherein $N_B$ is the determined number of data blocks and $N_C$ the determined number of data block changes.

2. The computer-implemented method of claim 1, wherein determining the sequential access comprises using a least recently used (LRU) algorithm to determine how the data blocks have been accessed.

3. The computer-implemented method of claim 1, wherein determining the sequential access comprises accessing the plurality of rows of the database table sequentially according to a native key sequence.

4. The computer-implemented method of claim 1, wherein the operations further comprise:
    determining a number of data blocks that contain data, wherein calculating the sequential access efficiency further comprises:
        calculating the sequential access efficiency based on the determined number of data block changes and the determined number of data blocks.

5. The computer-implemented method of claim 1, wherein the operations further comprise:
    determining a block count, wherein the block count is based on a maximum number of rows per data block and a number of the plurality of rows; and
    wherein calculating the sequential access efficiency further comprises calculating the sequential access efficiency based on the determined number of data block changes and the determined block count.

6. The computer-implemented method of claim 1, wherein the operations further comprise:
    determining a first buffered sequential access of the plurality of rows of the database table based on a first number of buffers used to buffer the first buffered sequential access;
    determining a first number of first data block changes that occur during the first buffered sequential access; and
    calculating a first buffered sequential access efficiency value based on the determined first number of data block changes and the first number of data buffers utilized to buffer the first buffered sequential access.

7. The computer-implemented method of claim 6, wherein the operations further comprise:
    determining a second buffered sequential access of the plurality of rows of the database table based on a second number of buffers used to buffer the second buffered sequential access;
    determining a second number of first data block changes that occur during the second buffered sequential access; and
    calculating a second buffered sequential access efficiency value based on the determined second number of data block changes and the second number of data buffers utilized to buffer the first buffered sequential access.

8. The computer-implemented method of claim 7, wherein the operations further comprise:
    generating a report that comprises the calculated sequential access efficiency, the calculated first buffered sequential access efficiency value, and the calculated second buffered sequential access efficiency value.

9. The computer-implemented method of claim 1, wherein determining the sequential access comprises determining the sequential access while the database is online.

10. The computer-implemented method of claim 1, wherein determining the sequential access comprises determining the sequential access while the database is offline.

11. A computer-implemented system of determining sequential access efficiency for a database table, the system comprising:
    a processor to:
    determine a sequential access of a plurality of rows of a database table, wherein the plurality of rows are stored using a plurality of data blocks, wherein the sequential access occurs when a portion of the database table is accessed;
    determine a number of data block changes that occur during the sequential access of the plurality of rows in the database table, wherein a data block change occurs when a current row is stored in a first data block and a next row is stored in a second data block, different from the first data block, such that accessing the next row after accessing the current row results in the data block change; and calculate a sequential access efficiency based on the determined number of data block changes, wherein calculating the sequential access efficiency is performed using the following equation:

$$(N_B-1)/N_C$$

wherein $N_B$ is the determined number of data blocks and $N_C$ the determined number of data block changes.

12. The computer-implemented system of claim 11, wherein the processor to determine the sequential access is further to use a least recently used (LRU) algorithm to determine how the data blocks have been accessed.

13. The computer-implemented system of claim 11, wherein the processor to determine the sequential access is further to access the plurality of rows of the database table sequentially according to a native key sequence.

14. The computer-implemented system of claim 11, wherein the processor is further to:
  determine a number of data blocks that contain data, wherein the processor to determine the sequential access efficiency is further to calculate the sequential access efficiency based on the determined number of data block changes and the determined number of data blocks.

15. The computer-implemented system of claim 11, wherein the processor is further to:
  determine a block count, wherein the block count is based on a maximum number of rows per data block and a number of the plurality of rows, wherein the processor to determine the sequential access efficiency is further to calculate the sequential access efficiency based on the determined number of data block changes and the determined block count.

16. The computer-implemented system of claim 11, wherein the processor is further to:
  determine a first buffered sequential access of the plurality of rows of the database table based on a first number of buffers used to buffer the first buffered sequential access;
  determine a first number of first data block changes that occur during the first buffered sequential access; and
  calculate a first buffered sequential access efficiency value based on the determined first number of data block changes and the first number of data buffers utilized to buffer the first buffered sequential access.

17. The computer-implemented system of claim 16, wherein the processor is further to:
  determine a second buffered sequential access of the plurality of rows of the database table based on a second number of buffers used to buffer the second buffered sequential access;
  determine a second number of first data block changes that occur during the second buffered sequential access; and
  calculate a second buffered sequential access efficiency value based on the determined second number of data block changes and the second number of data buffers utilized to buffer the first buffered sequential access.

18. The computer-implemented system of claim 17, wherein the processor is further to:
  generate a report that comprises the calculated sequential access efficiency, the calculated first buffered sequential access efficiency, and the calculated second buffered sequential access efficiency value.

19. A non-transitory, tangible computer-readable storage medium having computer-readable instructions thereon which when executed by a processor cause the processor to:
  determine a sequential access of a plurality of rows of a database table, wherein the plurality of rows are stored using a plurality of data blocks, and wherein the sequential access occurs when a portion of the database table is accessed;
  determine a number of data block changes that occur during the sequential access of the plurality of rows in the database table, wherein a data block change occurs when a current row is stored in a first data block and a next row is stored in a second data block, different from the first data block, such that accessing the next row after accessing the current row results in the data block change; and
  calculate a sequential access efficiency based on the determined number of data block changes, wherein calculating the sequential access efficiency is performed using the following equation:

$$(N_B-1)/N_C$$

wherein $N_B$ is the determined number of data blocks and $N_C$ the determined number of data block changes.

20. The non-transitory, tangible computer-readable storage medium of claim 19, wherein the computer-readable instructions further cause the processor to:
  determine a first buffered sequential access of the plurality of rows of the database table based on a first number of buffers used to buffer the first buffered sequential access;
  determine a first number of first data block changes that occur during the first buffered sequential access; and
  calculate a first buffered sequential access efficiency value based on the determined first number of data block changes and the first number of data buffers utilized to buffer the first buffered sequential access.

21. The non-transitory, tangible computer-readable storage medium of claim 20, wherein computer-readable instructions further cause the processor to:
  determine a second buffered sequential access of the plurality of rows of the database table based on a second number of buffers used to buffer the second buffered sequential access;
  determine a second number of first data block changes that occur during the second buffered sequential access; and
  calculate a second buffered sequential access efficiency value based on the determined second number of data block changes and the second number of data buffers utilized to buffer the first buffered sequential access.

22. The non-transitory, tangible computer-readable storage medium of claim 21, wherein the computer-readable instructions further cause the processor to:
  generate a report that comprises the calculated sequential access efficiency, the calculated first buffered sequential access efficiency value, and the calculated second buffered sequential access efficiency value.

* * * * *